Sept. 2, 1969         G. W. MORK ET AL         3,464,528
           SAFETY CONTROL SYSTEM FOR A CABLE DRUM
Filed Aug. 2, 1967                          2 Sheets-Sheet 1

Fig. 1

INVENTORS
GEORGE W. MORK
VERNON F. WALDRON
ROBERT C. WALKER

BY Thomas W. Sherman
       ATTORNEY

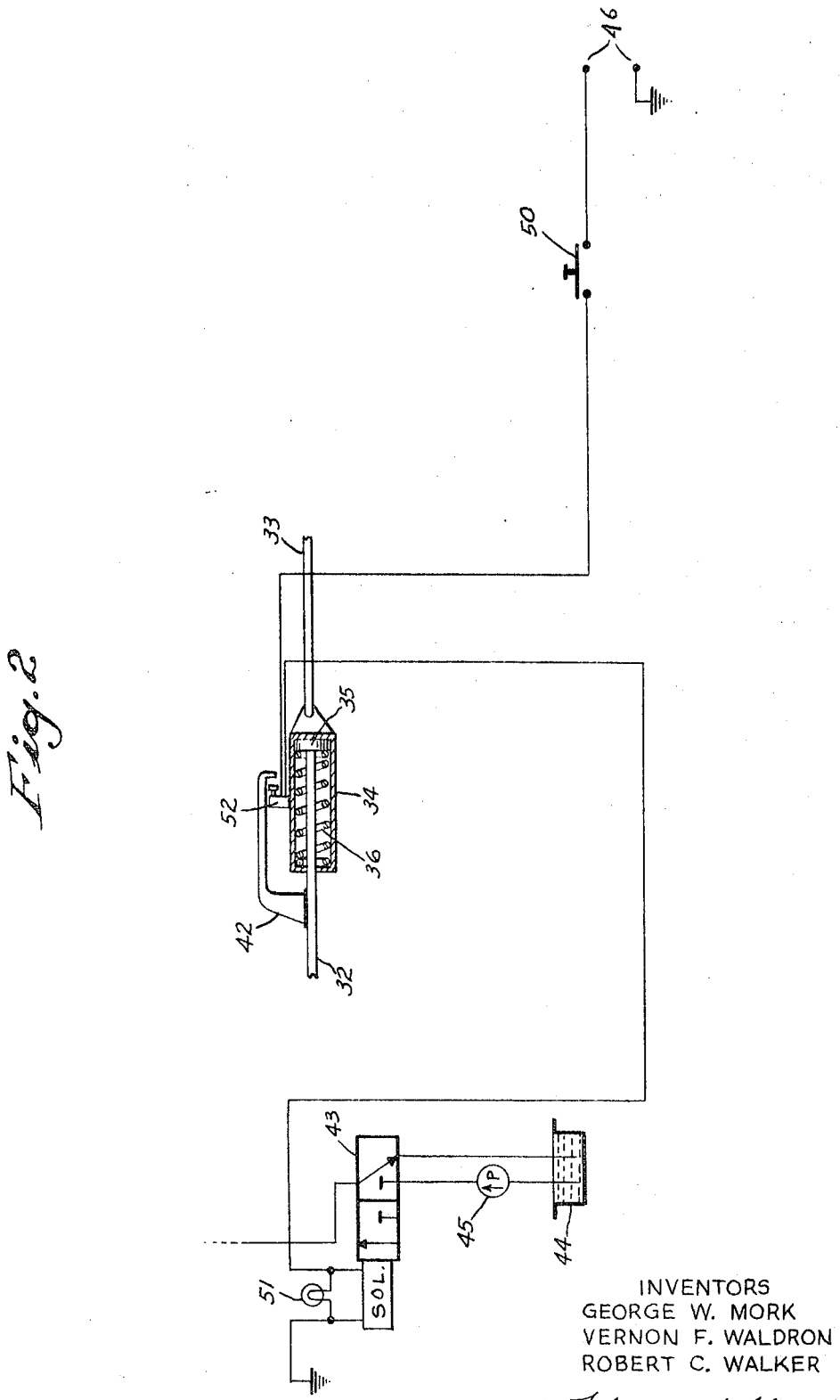

United States Patent Office 3,464,528
Patented Sept. 2, 1969

3,464,528
SAFETY CONTROL SYSTEM FOR A
CABLE DRUM
George W. Mork, South Milwaukee, Vernon F. Waldron, Oak Creek, and Robert C. Walker, South Milwaukee, Wis., assignors to Bucyrus-Erie Company, South Milwaukee, Wis., a corporation of Delaware
Filed Aug. 2, 1967, Ser. No. 657,961
Int. Cl. F16d 67/02, 13/44, 25/00
U.S. Cl. 192—17                                8 Claims

ABSTRACT OF THE DISCLOSURE

A hoist cable drum is provided with a clutch of the internal expanding type which is spring biased to normally connect the drum to a power shaft and which is hydraulically actuated to disengage the drum from the power shaft. A brake band operates on a flange of the drum and is tightened for braking by rotation of a bell crank lever connected by a linkage to a foot pedal. The linkage includes a lost motion connection such that the foot pedal may be moved beyond a point at which the brake band is fully engaged with the drum, and such motion of the foot pedal closes normally open brake contacts to complete an electrical circuit to energize a solenoid controlled hydraulic valve. When the solenoid of the valve is energized, the valve is shifted to admit hydraulic fluid under pressure to the clutch to release the same. Thus, the clutch is not released until the brake is fully engaged. In one embodiment the closing of the brake contacts completes a circuit to a latching relay which causes the relay contacts to close and complete the circuit to energize the valve solenoid, and the latching relay will hold its relay contacts closed if the brake is released and until the normally open contacts are again closed after the brake is again fully engaged.

Thus, it is not possible to re-engage the clutch until the hoist cable and its drum have been brought to a stop. A second embodiment accomplishes the same function by employing normally open contacts of a push-push switch as the brake contacts, with the switch being closed after full engagement of the brake and remaining closed until after the brake is again fully engaged.

Background of the invention

This invention relates to a control system for cable drums, and particularly to a control system to coordinate the operation of the brake and clutch of a hoist cable drum such that the clutch cannot be disengaged to disconnect the drum from its source of power until the brake is fully engaged and such that the clutch cannot be re-engaged until the brake is fully engaged a second time.

Hoist cable drums for cranes and the like are commonly provided with a disconnect clutch which controls the driving of the drum from a source of power, and with a brake to halt the rotation of the drum and thereby halt the lowering or hoisting of the hoist cable. Certain destructive and potentially dangerous conditions may result if the operations of the brake and clutch are not properly coordinated. Specifically, if the crane operator should disengage the clutch while the brake is also disengaged the hoist drum will be able to be freely rotated without control. This could result in an uncontrolled free fall of a load on the hoist cable. A second dangerous condition can exist when the clutch is disengaged and the load on the hoist cable under free fall. If the operator should attempt then to re-engage the clutch when the hoist drum is not stopped, extensive damage can be done to the clutch or the power transmission medium, as for instance a hydrostatic drive. Accordingly, a need exists to insure that neither of these two conditions can occur. That is, to insure that the brake must be fully engaged before the clutch can be disengaged to disconnect the drum from the source of power and also to insure that the drum is at a stop when the clutch is re-engaged to again connect the hoist drum to the source of power. The control system of this invention accomplishes these two safety functions.

Summary of the invention

A control system for a cable drum in accordance with the invention comprises a brake operable by a foot pedal acting on the drum with brake control means for engaging and disengaging the brake with the drum, a clutch normally connecting the drum to a source of motive power and being disengaged by actuable means to disconnect the drum from the source of motive power, and interlock means responsive to the brake control means such that said interlock means will actuate said actuable means to disengage said clutch only after the brake is fully engaged and will maintain said actuable means actuated when the brake is released and until after the brake is again fully engaged. The invention further contemplates the employment of a lost motion connection in a linkage which connects the brake to a brake lever which is movable to engage and disengage the brake whereby the lost motion connection permits the brake lever to be moved beyond a point at which the brake is fully engaged. The interlock means is then made responsive to the movement of the brake lever beyond such point so that the brake must be fully engaged before the interlock means can function to either actuate or deactuate said actuable means.

Objects of the present invention include the following:

To provide a control system for a hoist cable drum in which the drum cannot be disconnected from its source of motive power until a brake on the drum is fully engaged.

To provide a control system for a hoist cable drum in which a freely rotating drum cannot be reconnected to its source of motive power until the drum has been brought to a complete stop.

In the specification and the accompanying drawings, several embodiments of the present invention are disclosed, and the invention and manner of making and use the same are sufficiently described to enable any person skilled in the art to which it pertains to make and use the invention. However, the embodiments thus disclosed represent only the best modes currently contemplated for carrying out this invention and the invention is obviously not limited to these specific embodiments.

Brief description of the drawings

FIG. 1 is a view in side elevation of a control system for a hoist cable drum with the drum shown in vertical section and with certain of the control elements shown in diagrammatic form; and FIG. 2 is a view of another embodiment of the invention utilizing different components in the control system and being illustrated in diagrammatic form.

Description of the preferred embodiments

In FIG. 1, a hoist cable drum 10 is shown mounted on an equipment deck 11 of a crane. A hoist cable 12 is wound about the drum 10 and extends around a boom point sheave 13 rotatably mounted on the point of a boom 14. It is, of course, to be understood that the boom 14 is connected at its foot in any one of the usual manners and that the drum 10 will control the hoisting and lowering of loads on the hoist cable 12.

The drum 10 includes an integral flange 15 and a clutch operates on the inner periphery of the flange 15. The clutch is of a known type and includes a hub 16 keyed for rotation to a powered shaft 17. The hub 16 mounts a clutch driver 18 which in turn mounts fulcrum pins 19. Left and right hand clutch levers 20 and 21, respectively, are pivotally supported intermediate their ends on the fulcrum pins 19. The upper ends of the clutch levers 20 and 21 are pivotally connected by links 22 to the two ends of a clutch band 23. The lower ends of the clutch levers 20 and 21 are normally biased together, in a manner to be described, to have the upper ends of the levers 20 and 21 urged apart to thereby urge the clutch band 23 into engagement with the inner periphery of the flange 15.

The lower ends of the clutch levers 20 and 21 are connected by a spring set hydraulic cylinder 24. That is, the left hand clutch lever 20 is pinned to the blind end of a cylinder casing 25 and the right hand clutch lever 21 is pinned to a piston rod 26. A compression spring 27 is biased between the rod end of the cylinder casing 25 and a shoulder 28 on the piston rod 26. Thus, the spring 27 normally urges the piston rod 26 into the cylinder casing 25 and thereby normally urges the lower ends of the clutch levers 20 and 21 together to engage the clutch with the drum 10 so that the drum is normally connected to the powered shaft 17. A piston 29 is mounted on the end of the piston rod 26 and, upon the introduction of hydraulic fluid under pressure into the blind end of the cylinder casing 25, the piston rod 26 will be moved out of the cylinder casing 25 and the lower ends of the clutch levers 20 and 21 will be pivoted apart. The result is that the clutch band 23 is contracted away from engagement with the flange 15 and the drum 10 is disconnected from the powered shaft 17. The clutch is double acting so that when engaged it will pull the same in either direction of rotation.

The outer periphery of the flange 15 is engaged by a brake band 30 which is operated by brake control means including a brake lever and a linkage with a lost motion mechanism. The brake band 30 is anchored at one end to the deck 11 and connected at its other end to one arm of a bell crank lever 31. The bell crank lever 31 is supported at its pivot on the deck 11 and has its second arm extending below the deck 11 to connect with a first linkage rod 32. This first linkage rod 32 is connected to a second linkage rod 33 by means of a lost motion mechanism which comprises a cylindrical casing 34 formed as an extension of the second linkage rod 33 and having an opening at one end through which the first linkage rod 32 extends. The first linkage rod 32 has a shoulder 35 at its end and a compression spring 36 is biased between such shoulder 35 and the rod end of the casing 34 within the casing. The second linkage rod 33 is pivotally connected to an intermediate point on a brake lever 37 that is pivotally anchored at its lower end below the deck and that extends above the deck 11 and mounts a brake foot pedal 38.

It will be seen that the brake band 30 is engaged with the outer periphery of the drum flange 15 by the operator depressing the brake pedal 38. That is, movement of the brake pedal lever 37 through an arc to the right as viewed in FIG. 1 from its normal upright position will move both the rods 32 and 33 to the right thereby rotating the bell crank lever 31 to tighten the brake band 30 on the drum. The initial motion of the brake pedal lever 37 through its arc will move the linkage rods 32 and 33 together to cause the brake band 30 to engage the flange 15 and the brake pedal lever can continue to be moved beyond the point at which the brake band 30 is fully engaged by overcoming the force of the compression spring 36. Thus, at or near full brake engagement the linkage rod 33 will be moved a relatively greater distance than the linkage rod 32. When the compression spring 36 is overcome after full brake engagement an electrical contact 39 mounted on an arm 40 secured to the cylindrical casing 34 will close with a second electrical contact 41 mounted on a bracket 42 extending from the first linkage rod 32 and overlying the arm 40.

The control of the supply of hydraulic fluid under pressure to the blind end of the hydraulic cylinder 24, and the venting of the same, is accomplished by a two-position solenoid controlled valve 43.

In its normal position when the solenoid is not energized, the valve 43 connects the blind end of the hydraulic cylinder 24 to a reservoir 44 of hydraulic fluid. Upon energization of the solenoid of the valve 43, the valve is shifted to the right as viewed in FIG. 1 to connect the output of a hydraulic pump 45 to the blind end of the hydraulic cylinder 24.

An electrical circuit for controlling the energization of the solenoid of the valve 43 extends from a source of electrical current 46 through normally open relay contacts 47 of a latching relay 48, through the solenoid, and then to ground. The circuit for energizing the windings 49 of the latching relay 48 extends from the current source 46, through a push button ON-OFF switch 50, the normally open brake contacts 39 and 41, the relay winding 49, and then to ground.

Therefore, with the ON-OFF switch 50 closed, the closure of the contacts 39 and 41 will close the circuit to the relay winding 49 to energize the same and have the relay 48 close the relay contacts 47 to close the circuit to energize the solenoid of the valve 43. This results in the supply of hydraulic fluid under pressure from the pump 45 to the blind end of the hydraulic cylinder 24 to disengage the clutch and thereby disconnect the drum 10 from the powered shaft 17. It will thus be seen that the clutch will be disengaged only after the brake has been fully engaged. By such interlocking between the brake and clutch, it is not possible for the operator to inadvertently remove the drum 10 from the effective control of both the brake and clutch at the same time.

A warning bulb 51 may be connected in parallel with the solenoid of the valve 43 to light when the solenoid is energized and clutch is therefore disengaged.

Upon subsequent release of the brake by the operator releasing the brake lever 37, the electrical contacts 39 and 41 will open and thereafter the brake will be disengaged. However, the latching relay 48 will continue to hold its relay contacts 47 closed to maintain the energization of the solenoid and the disengagement of the clutch. The winding 49 of the latching relay 48 will again be energized to reopen the relay contacts 47 only upon a subsequent full engagement of the brake by the operator which will again close the brake contacts 39 and 41. Thus, once the clutch has been disengaged, control of the hoist cable drum 10 is transferred to the brake alone and free fall of a load on the hoist cable 12 is permitted. However, the clutch cannot be re-engaged to connect the drum to its source of motive power until after the load, and consequently the drum, are brought to a complete stop by the movement of the brake to full engagement which will again close the contacts 39 and 41.

Referring to FIG. 2, an alternate means of interlocking the operation of the clutch and brake is shown. The arrangement of the brake and clutch in this second embodiment is the same as in the embodiment of FIG. 1 and is not repeated. In the second embodiment the function of the latching relay is performed by a push-push switch. The contacts of the push-push switch also replace the brake contacts. Specifically, a push-push switch 52 is secured to the cylindrical casing 34. The switch 52 has an operator that is contacted by the bracket 42 which will actuate the switch. The switch 52 is of the known type in which normally open switch contacts are closed by the first actuation of the switch and will remain closed until the switch is again actuated. Therefore, after the first full engagement of the brake the switch 52 will be closed and a circuit is completed from the current source 46 through the solenoid of the valve 43 to disengage the clutch. The clutch will remain disengaged until the switch 52 is reopened after the brake is again fully engaged to de-energize the solenoid and engage the clutch.

While the fluid connection to the hydraulic cylinder 24 is shown in diagrammatic form in FIG. 1, it is to be understood that the blind end of the hydraulic cylinder 24 is connected in a conventional manner by suitable hosing to a passage in the powered shaft 17 which in turn leads to a rotatable fitting connected to a line leading to the valve 43. Thus, the entire clutch rotates with the powered shaft 17.

The invention has been described in relation to its use for controlling a hoist cable drum. It should be appreciated that the invention is useful for coordinating and interlocking the operation of a brake and clutch for any cable drum to eliminate potentially dangerous conditions.

What is claimed is:

1. In a control system for a cable drum adapted to be driven from a source of motive power, the combination comprising:
    a clutch normally connecting said drum to said source of motive power;
    actuable means for disengaging said clutch to disconnect said drum from said source of motive power;
    a brake operable on said drum;
    brake control means for engaging and disengaging said brake with said drum;
    and interlock means responsive to said brake control means and adapted to control the actuation and deactuation of said actuable means, said interlock means actuating said actuable means to disengage said clutch upon the full engagement of said brake with said drum, said interlock means including hold-in means adapted to maintain the actuation of said actuable means when said brake is released and until said brake is again fully engaged with said drum.

2. A control system in accordance with claim 1 wherein said actuable means includes electrically energizable means, and said interlock means includes an electrical circuit adapted to connect said energizable means to a source of electric current and means responsive to said brake control means to complete said circuit to said energizable means to actuate said actuable means to disengage said clutch upon the full engagement of said brake.

3. A control system in accordance with claim 2 wherein said brake control means comprises a movable brake lever and linkage means connecting said brake lever to said brake, and wherein said means responsive to said brake control means comprises lost motion means disposed in said linkage means to allow movement of said brake lever beyond the point at which said brake is fully engaged and electrical contacts adapted to be closed when said brake lever is moved beyond the point of full engagement of said brake, the closing of said electrical contacts completing the circuit to said energizable means.

4. In a control system for a cable drum adapted to be driven from a source of motive power, the combination comprising:
    a clutch normally connecting said drum to said source of motive power;
    electrically actuable means for disengaging said clutch to disconnect said drum from said source of motive power;
    a brake operable on said drum;
    a movable brake lever;
    lost motion means;
    a first linkage connected between said brake and said lost motion means;
    a second linkage connected between said lost motion means and said brake lever, said brake lever being movable to move said linkages and lost motion means to engage said brake and said lost motion means permitting further movement of said brake lever beyond the point of full engagement of said brake;
    a source of electric current;
    an electrical circuit adapted to connect said electrically actuable means to said source of current;
    and means responsive to the movement of said brake lever beyond the point of full engagement of said brake to complete said circuit to actuate said actuable means and thereby disengage said clutch.

5. A control system in accordance with claim 4 wherein said means responsive to the movement of said brake lever is further adapted to maintain said circuit closed when said brake lever is moved to disengage said brake from said drum and until said brake lever is again moved beyond the point of full engagment of said brake.

6. A control system in accordance with claim 5 wherein said clutch is spring biased toward engagement to connect said drum to said source of motive power and is hydraulically actuated to be disengaged, and wherein said electrically actuable means comprises a solenoid controlled hydraulic valve disposed between a source of hydraulic fluid under pressure and said clutch, said valve being shifted upon energization of its solenoid by the closing of said circuit to admit hydraulic fluid under pressure from said source to said cluch to disengage said clutch.

7. A control system in accordance with claim 5 wherein said means responsive to the movement of said brake lever comprises a first electrical contact disposed on said first linkage, a second electrical contact disposed on said second linkage, and a latching relay having relay contacts connected in said circuit, said first and second contacts being normally open and being closed when said linkages move relative to each other as said brake lever is moved beyond the point of full engagement of said brake, the closing of said first and second contacts completing a circuit from said source of current to energize said relay to close said relay contacts to complete said circuit to said actuable means, said latching relay holding said relay contacts closed until said first and second contacts are opened and then reclosed.

8. A control system in accordance with claim 5 wherein said means responsive to the movement of said brake lever comprises a normally open push-push switch disposed on one of said linkages and a switch actuator disposed on the other of said linkages, said switch being engaged by said switch actuator to close said switch when said linkages move relative to each other as said brake lever is moved beyond the point of full engagement of said brake to close said circuit from said source of current to said actuable means, said switch remaining closed until said switch actuator again engages said switch upon the subsequent full engagement of said brake.

References Cited

UNITED STATES PATENTS

| 1,479,034 | 1/1924 | Fernow | 192—17.2 XR |
| 2,279,597 | 4/1942 | Selmer | 192—12.1 |
| 2,521,486 | 9/1950 | Seybold | 192—17.2 |
| 2,675,103 | 4/1954 | Weber | 192—17.2 |
| 2,836,270 | 5/1958 | Leopold | 192—12.1 |
| 2,975,584 | 3/1961 | Makaut et al. | 192—18.1 XR |
| 3,198,301 | 8/1965 | Randall. | |

BENJAMIN W. WYCHE III, Primary Examiner

U.S. Cl. X.R.

192—91, 92; 188—77; 254—187